Patented Mar. 21, 1950

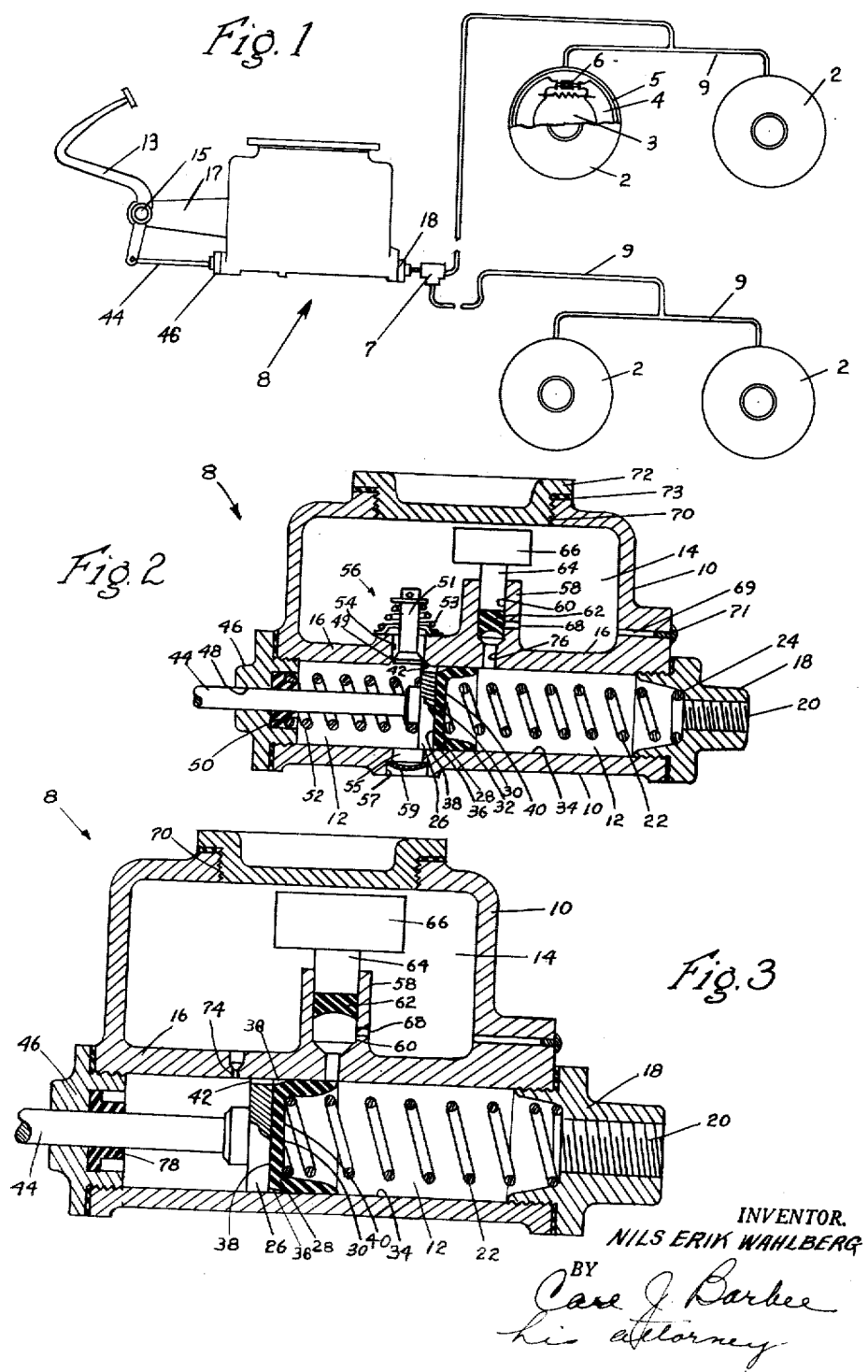

2,501,108

UNITED STATES PATENT OFFICE 2,501,108

HYDRAULIC BRAKE MASTER CYLINDER

Nils Erik Wahlberg, Chicago, Ill., assignor to Nash-Kelvinator Corporation, Kenosha, Wis., a corporation of Maryland Application November 2, 1944, Serial No. 561,562

9 Claims. (Cl. 60—54.6)

This invention relates to hydraulic brakes and more particularly to a master cylinder for an automotive hydraulic braking system.

It is an object of this invention to provide a hydraulic brake master cylinder which is easily manufactured, is relatively economically constructed and yet performs its functions efficiently and dependably.

It is a further object of this invention to provide a master cylinder which can be assembled from parts which are simple and cheap to manufacture.

It is a further object of this invention to provide a master cylinder in which advantages of economy and efficiency are present, which will function so as to maintain a residual pressure in the fluid lines of the system while the system is not in use and yet will bleed air and vapor bubbles from the system as well as replenish the supply of fluid in the system upon each actuation of the piston.

Further objects and advantages of the invention will appear hereinafter as the description proceeds and will be pointed out more fully in connection with the appended claims.

In the drawing, of which there is one sheet;

Figure 1 is a diagrammatic side elevational view partially in section of a brake system showing the master cylinder of the present invention and actuating means, fluid lines and the brake mechanism for the wheels;

Figure 2 is a cross sectional view of a brake master cylinder showing the various parts in their at-rest positions; and Figure 3 is a cross sectional view of a modified form of a brake master cylinder with the various parts in partially actuated position.

Referring in detail to the drawing, in which similar reference characters are employed to designate similar parts, the brake system is illustrated in Figure 1 as comprising a set of brake drums 2 which may be suitably mounted upon wheels of a vehicle (not shown). The brake drums 2 are provided with backing plates 3 supported from the vehicle and in turn supporting, by any desired means, brake shoes 4 provided with friction facing material 5. The brake shoes 4 are, in this case, of the internally expanding type and are adapted to be urged into braking position against the interior of the drums 2 by means of motors comprising wheel cylinders 6 located between adjacent ends of the shoes 4 for spreading such ends apart and forcing the friction surfaces 5 into contact with the inside diameter of the drum 2.

The wheel cylinders 6 are actuated by means of the fluid lines 9 which are supplied with fluid under pressure through a coupling 7 from the brake master cylinder illustrated generally at 8. The coupling 7 may be provided with a male thread threadedly engaged with the female pipe thread 20 (Figures 2 and 3) provided in a plug 18 threaded into the end of the master cylinder (Figures 2 and 3).

The actuating means located on the forward side of master brake cylinder 8 comprises a foot pedal lever 13 rotatable about the axis of bolt 15 which is secured to brace 17 from the chassis (not shown). The lower end of lever 13 is rotatably secured to piston rod 44 extending from piston 26 (Figures 2 and 3) through plug 46 threaded into the forward end of the master cylinder 8.

The brake master cylinder 8 is illustrated in Figure 2 as comprising a body 10 which may be cast of iron or other suitable material. It should be noted that the body portion 10 is of single wall thickness and therefore can be manufactured quite simply without the necessity of using multiple cores and may indeed be made from a green sand core with a single internal dry sand core.

The body casting 10 is provided with a longitudinal cylinder 12 extending through the lower portion of the body 10. The upper region of body 10 is provided with a fluid reservoir 14 positioned above cylinder 12 and separated therefrom by a wall 16 of body 10.

Into the rearmost end of cylinder 12 is threaded the plug 18 having an internally threaded aperture 20 into which may be threaded the coupling 7 through which fluid under pressure is supplied from the cylinder 12 to the fluid lines 9 (Figure 1) and wheel cylinder 6 (Figure 1) of the brake system. Into the forward end of cylinder 12 is inserted a compression spring 22 having its one end seated on the inner face 24 of plug 18. A piston 26 is then inserted into the forward end of cylinder 12. The piston 26 is provided upon its rearwardly presented surface with a cup washer 28 of rubber or similar flexible elastic material, said cup washer 28 having a disc-like body portion 30 and a peripheral, upstanding, tapering flange 32 extending circumferentially therearound and acting to seal the cup washer 28 against the inside walls 34 of the cylinder 12. Cup washer 28 is also provided with a beveled portion 36 between its forwardly presented surface 38 and the outer surface of the flange 32. Compression spring 22 has one end seated on the rearwardly presented surface 40 of cup washer 28, thereby holding cup washer 28 firmly against the rearward face of piston 26 at all times.

The piston 26 is provided with a groove 42 in its uppermost portion adjacent the bevel 36 of cup washer 28. The groove 42 permits fluid on the forward side of piston 26 to by-pass piston 26 and cup washer 28 as they are moved forwardly. The piston 26 is further provided with a piston rod 44 rigidly secured to the forwardly presented surface of piston 26. Piston rod 44 has a sliding fit in plug 46 which is threaded into the forward end of cylinder 12. Plug 46 has an aperture 48 through which rod 44 extends to its connection with the pedal lever 13 (Figure 1). Around the rod 44 and seated upon the rearward face of plug 46 is a seal 50 which embraces rod 44 to prevent fluid from passing along rod 44 through aperture 48. A compression spring 52 is placed between piston 26 and seal 50 to hold seal 50 firmly in place. Various other types of seals may be used in place of the single spring-seal combination shown in Figure 2.

The wall 16 of body 10 has a port 54 therethrough extending from reservoir 14 to cylinder 12. A simple poppet valve mechanism, indicated generally at 56, comprising a valve 51 maintained in seated position in seat 49 formed in the cylinder wall at the bottom of port 54 by spring 53, alternately opens and closes port 54 to regulate the flow of fluids from reservoir 14 to cylinder 12. This port and valve combination is positioned forwardly of the most forward, or retracted, position of the forward surface of piston 26 to insure that fluid is at all times supplied to cylinder 12 ahead of piston 26.

It is necessary to form aperture 55 in the wall of cylinder 12 opposite port 54 and extending outwardly through body 10, making the bottom of port 54 accessible to form valve seat 49 therearound in the wall of cylinder 12. Aperture 55 has an enlarged lower portion 57 in which is placed a welch plug 59 to prevent loss of fluid from cylinder 12.

Upon rearward movement of piston 26 in cylinder 12, a slight drop in pressure will occur upon the forward side of piston 26 (as viewed in Figure 2) and this pressure drop will overcome the action of spring 53 opening valve 51 and admitting fluid to that portion of cylinder 12 which is forward from piston 26.

The upper wall 16 of cylinder 12 is provided with a boss 58 through which a stepped diameter duct or passageway extends. The upper portion 60 of the duct has the larger diameter and is adapted to receive for sliding movement therein a cup washer 62 of rubber or other suitable material having an outside diameter closely fitting the upper passageway portion 60. Also slidably received in passageway 60 is a piston 64 which normally nests against the upper surface of cup washer 62, the piston 64 being integral with a weight 66 which functions to press piston 64 and cup washer 62 downwardly in passageway 60. Boss 58 is provided with an external port 68 at or near its bottom portion which connects the passageway 60 with the reservoir 14. Body portion 10 is provided with a like port 69 aligned with port 68 through which the bit of a power drill may be extended from the outside of body 10 to form port 68. Plug 71 is secured in aperture 69 to close said aperture after port 68 has been drilled.

The reduced diameter 76 of the passageway provides a limiting means to prevent cup washer 62 from dropping into cylinder 12.

An aperture 70 tapped and threaded to receive a threaded cap 72 is provided in the top of body 10 to make possible adding fluid to reservoir 14. Gasket 73 is interposed between cap 72 and body 10 to insure a fluid-tight connection therebetween.

Figure 3 is a slightly modified form of the invention shown in Figure 2 with the mechanism shown in a partially actuated condition. This modified form embodies the same body 10, cylinder 12, piston 26, cup washer 28, spring 22, plugs 18 and 46, rod 44, weight 66 and boss 58 with mechanism therein.

The modifications are the use of a near capillary-sized port 74 in wall 16 extending therethrough to replace port 54 and the valve mechanism therein of Figure 2. This permits the free flow of fluid from reservoir 14 when piston 26 is actuated rearwardly, thus compensating for the reduced fluid pressure in the portion of cylinder 12 forward of piston 26. Further, with the use of port 74 there is no need for an aperture such as 55 of Figure 2 as wall 16 is accessible through aperture 70 so that a port such as port 74 may be drilled therein. A further modification of the invention as shown in Figure 3 is the use of a self-maintained seal 78 which will stay in position without the use of a spring such as spring 52 of Figure 2.

The invention is shown at its at-rest position in Figure 2. It will be noted that cup washer 62 has port 68 closed so that there is no outlet for the fluid in the cylinder 12 other than through aperture 20 to the fluid lines 9 (Figure 1) of the system. Weight 66 constantly urges piston 64 and cup washer 62 downwardly to maintain a slight residual fluid pressure in the system commensurate with the force exerted by weight 66.

When piston 26 is partially actuated as shown in Figure 3, the excess fluid will be forced out of cylinder 12 into the lower portion of aperture 60 below cup washer 62. This will force cup washer 62 upwardly, uncovering port 68 through which this excess fluid may escape to the fluid reservoir 14. The excess fluid will carry with it to the reservoir 14 any air or vapor bubbles as they will gather in aperture 60 directly below cup washer 62, this region being the high point in the system when it is at rest as shown in Figure 2. As piston 26 is moved forwardly beyond the position shown in Figure 2, cup washer 28 will close aperture 60 and greater pressure will be created in the system to actuate the wheel cylinders 6 (Figure 1). When piston 26 is thus moved forwardly, fluid will pass through port 54 into cylinder 12 when valve 56 of Figure 2 opens as a result of the drop in pressure on the forward side of piston 26. This will fill the space left by piston 26 with fluid. Similarly, fluid will freely flow through port 74 of the mechanism shown in Figure 3 as piston 26 is actuated rearwardly. As piston 26 is retracted, the fluid admitted by ports 54 and 74 of Figures 2 and 3, respectively, on the retractile or forward side of piston 26 will pass through groove 42 of piston 26 and by-pass resilient cup washer 28 between its outer surface and the walls 34 of cylinder 12, thus refilling the cylinder on the rearward side of piston 26.

In this manner, every stroke of piston 26 expels any air and vapor bubbles which have accumulated in the high point of the system and on the return stroke, a full supply of fluid is added to the system. The third essential of an efficient brake system; namely, maintenance of residual pressure in the system, is fulfilled by weight 66 constantly forcing cup washer 62 downwardly to maintain residual fluid pressure throughout the system.

While this invention has been described in considerable detail, said description is not to be taken as limiting the invention in any manner. All equivalents falling within the scope of the attached claims are expressly reserved.

What is claimed is:

1. A fluid pressure producing device comprising a reservoir, a cylinder at the base thereof, fluid in said reservoir, a piston in said cylinder reciprocable from a fully retracted to a fully extended position, means permitting flow of the fluid from the retractile side of the piston to the compression side thereof, an inlet port permitting restricted passage of fluid between the reservoir and cylinder and connecting said reservoir and said cylinder on the retractile side of said piston when in a fully retracted position, a second port connecting said reservoir and said cylinder on the compressive side of said piston, a second piston in a bore connected to said port for selectively closing said port, and weight means above said second piston constantly forcing the second piston downwardly to compress the fluid in the system.

2. A fluid pressure producing device comprising a reservoir, a cylinder at the base thereof, fluid in said reservoir, a piston reciprocable in said cylinder, an inlet port connecting the reservoir and cylinder and providing a restricted fluid passage therebetween on one side of said piston, means permitting flow of fluid from said inlet port past said piston, an aperture connecting said reservoir and piston, a plunger slidably positioned in said aperture, weight means abutting said plunger and urging it downwardly in said aperture to compress the fluid in the system, and a second port connecting the reservoir with the aperture intermediate the ends thereof and designed to be opened and closed by said plunger.

3. A fluid pressure producing device comprising a reservoir, a cylinder at the base thereof, fluid in said reservoir, a piston reciprocable in said cylinder, a passage directly connecting said cylinder and reservoir providing constant communication therebetween, a port connecting said reservoir and said cylinder forward of the at-rest position of said piston, a plunger in said port, weight means resting on said plunger and normally forcing said plunger downwardly in said port to compress the fluid in said cylinder, and a second port connecting said reservoir and said first port intermediate the ends thereof and designed to be opened when excessive pressure forces the plunger upwardly.

4. A hydraulic brake master cylinder comprising a reservoir, fluid in said reservoir, a cylinder supported below said reservoir in a horizontal position, a reciprocable piston within said cylinder, means directly connecting said reservoir and cylinder and permitting said fluid to completely fill said cylinder on one side of said piston, means permitting expulsion of some of said fluid from said cylinder to said reservoir by said piston, and weight means creating residual fluid pressure in said cylinder when said piston is in normal position.

5. In a fluid pressure system, a reservoir, fluid in said reservoir, a cylinder below said reservoir, an inlet port connecting the reservoir with the cylinder and providing a restricted flow of fluid therebetween, a reciprocable piston in the cylinder having means permitting fluid from said inlet port to bypass said piston when said fluid is compressed thereby, an outlet port having a vertical portion and a horizontal portion connecting the cylinder with the reservoir, a flexible cup on the face of the reciprocable piston controlling said outlet port, a free piston within the vertical portion of the outlet port controlling the horizontal portion of said port, and a weight means seated on said free piston urging the free piston downwardly over the horizontal portion of the outlet port and against the fluid mass within the cylinder to compress said fluid mass.

6. In a fluid pressure system, a reservoir, fluid in said reservoir, a cylinder below said reservoir, a piston in said cylinder reciprocable from a fully retracted to a fully extended position, a fluid supply port restrictively connecting said reservoir with said cylinder and located beyond the fully retracted position of said piston, means permitting the flow of fluid past said piston upon the retractile stroke thereof, an outlet port comprising a vertical aperture extending from the reservoir to the cylinder and a horizontal aperture connecting said vertical aperture and the reservoir, a floating piston in said vertical aperture controlling said horizontal aperture, weight means urging said floating piston downwardly to close said horizontal aperture and create fluid pressure in the cylinder, and a flexible cup seated on the face of the reciprocable piston controlling the outlet port and preventing fluid from by-passing said piston as the piston is extended.

7. A hydraulic master brake cylinder comprising a reservoir, fluid in said reservoir, a horizontal cylinder below said reservoir, a piston within said cylinder reciprocable from a fully retracted to a fully extended position, a supply port restrictively connecting said reservoir and said cylinder on the retractile side of the piston when at its at-rest position, means permitting fluid on the retractile side of the piston to by-pass said piston when retracted, an exhaust port located on the opposite side of said piston connecting the cylinder and the reservoir, weighted valve means in a bore connected to said exhaust port permitting the piston to discharge fluid from the cylinder when actuated and the weighted valve moving against the fluid mass thereby creating fluid pressure in the cylinder when the piston is at rest, a groove in said piston permitting fluid to by-pass said piston, and a flexible cup on the forward face of said piston preventing fluid from passing to the retractile side of said piston from its forward side.

8. In a hydraulic brake master cylinder, a pressure maintaining mechanism comprising a reservoir, fluid in said reservoir, a cylinder below said reservoir, an aperture directly connecting said cylinder and reservoir providing constant communication therebetween, a reciprocable piston in said cylinder, a port connecting said cylinder and said reservoir located so as to be closed upon actuation of said piston, said port comprising a vertical aperture extending from the cylinder to the reservoir and a longitudinal aperture extending from said vertical aperture to said reservoir, a floating piston reciprocable within said vertical aperture, and weight means seated on the top of said floating piston urging it downwardly to close the horizontal aperture and create fluid pressure in the cylinder and said floating piston adapted to be urged upwardly to uncover said horizontal aperture as excessive fluid pressure is created by actuation of the piston within the cylinder.

9. In a fluid pressure system, a fluid reservoir, a cylinder below said reservoir, a piston in said cylinder, means for constantly supplying fluid from said reservoir to said cylinder, a vertical port extending upwardly from said cylinder to said reservoir, and a weighted valve in a bore connected to said vertical port constantly moving against the fluid mass to create fluid pressure in said cylinder.

NILS ERIK WAHLBERG.

REFERENCES CITED

The following references are of record in the file of this patent:

UNITED STATES PATENTS

| Number | Name | Date |
|---|---|---|
| 433,618 | Cunningham | Aug. 5, 1890 |
| 1,474,192 | Gessler | Nov. 13, 1923 |
| 2,077,748 | Farina | Apr. 20, 1937 |
| 2,150,617 | Weihe | Mar. 14, 1939 |
| 2,152,485 | Kindl | Mar. 28, 1939 |
| 2,166,742 | Lambert | July 18, 1939 |
| 2,203,082 | Dick | June 4, 1940 |
| 2,211,651 | Fowler | Aug. 13, 1940 |
| 2,218,700 | Cornell | Oct. 22, 1940 |
| 2,222,848 | La Brie | Nov. 26, 1940 |

FOREIGN PATENTS

| Number | Country | Date |
|---|---|---|
| 438,615 | Great Britain | Nov. 20, 1935 |